L. M. BURNS.
WEEDING IMPLEMENT.
APPLICATION FILED JULY 17, 1915.
1,169,921.
Patented Feb. 1, 1916.
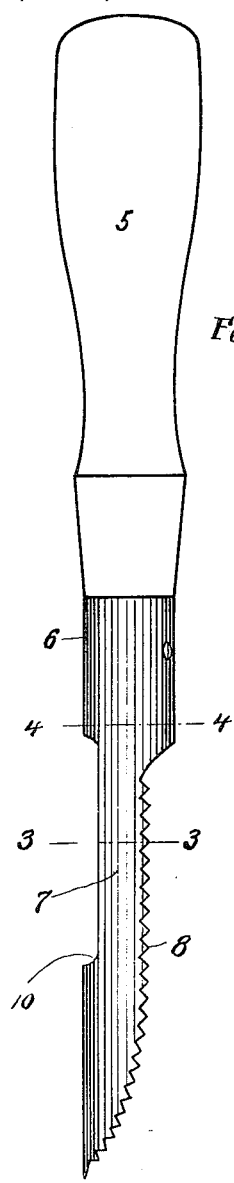
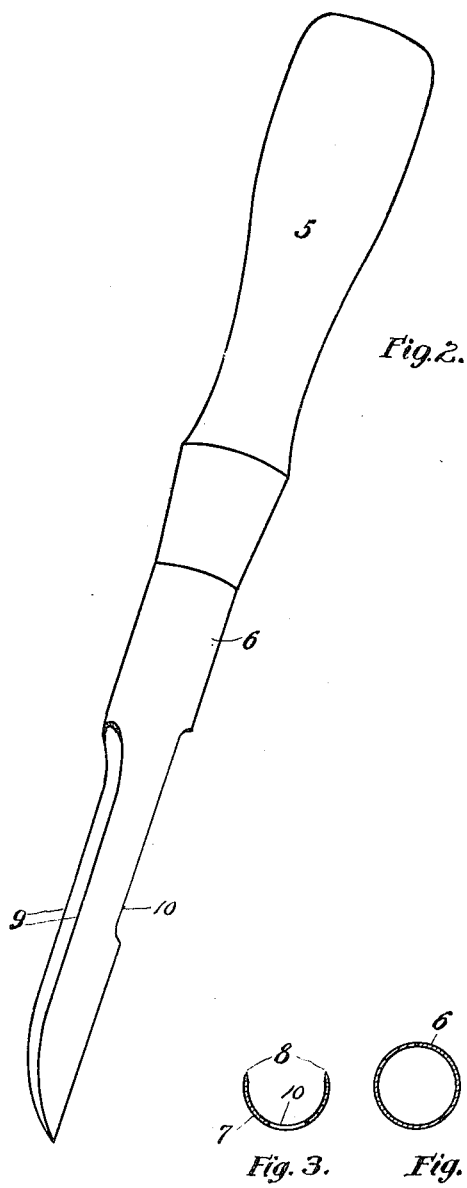
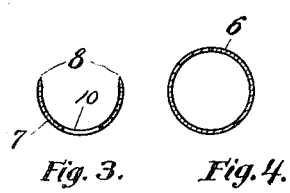
INVENTOR.
Louise M. Burns
BY
Max A. Schmidt
ATTORNEY.

UNITED STATES PATENT OFFICE.

LOUISE M. BURNS, OF WICHITA, KANSAS.

WEEDING IMPLEMENT.

1,169,921. Specification of Letters Patent. Patented Feb. 1, 1916.

Application filed July 17, 1915. Serial No. 40,510.

*To all whom it may concern:*

Be it known that I, LOUISE M. BURNS, a citizen of the United States, residing at Wichita, in the county of Sedgwick and State of Kansas, have invented certain new and useful Improvements in Weeding Implements, of which the following is a specification.

The device which is the subject matter of the present application for patent is designed more particularly for destroying dandelions and other weeds, and the object of the invention is to provide a novel and improved device of this kind which will destroy the weeds in the surest and speediest way, without disturbing or in any way injuring the sod or surrounding earth.

In order that the invention may be better understood, reference is had to the accompanying drawing, in which—

Figure 1 is an elevation of the device; Fig. 2 is a perspective view showing a slight modification, and Figs. 3 and 4 are sections on the lines 3—3 and 4—4 respectively, of Fig. 1.

In carrying out the invention, there is provided a wooden or other suitable handle 5 to the outer end of which is rigidly fastened a blade having a short tubular butt end 6 for attachment to the handle, and a cutting portion 7, which latter is curved in cross-section to provide two opposite cutting edges. In Fig. 1 these cutting edges are shown serrated at 8, and in Fig. 2 the cutting edges 9 are plain. The cutting edges, in each instance, are sharp, so that they will easily cut the fibers or rootlets of the main root of the weed. For a substantial distance from the butt end 6 of the blade, the cutting edges extend in parallelism, and their terminals are then convexly curved, the curved terminals converging and meeting at a point, so that the blade may easily penetrate the soil.

In operation, the blade is thrust straight down into the ground near the main root of the weed, and given a slight turn, after which it is withdrawn. As the blade penetrates the ground and is turned, it cuts all the projecting fibers or rootlets around the main root, and upon withdrawing the blade, the weed and its root are brought up without disturbing the surrounding soil beyond the circle described by the blade. The weed can therefore be readily taken up without any disfigurement of the lawn. It will be noted from Fig. 3 that the curve of the blade, at the parallel cutting edges, is slightly greater than 180 degrees, so that said cutting edges are given an inward turn, which holds the uprooted weed and the earth around the same, when the blade is withdrawn. The blade can therefore be lifted straight up out of the ground without dropping the weed and the earth around the root thereof.

The implement can be easily and cheaply manufactured, and it effectually serves the purpose for which it is designed, the operation being easily and quickly effected.

In order to facilitate the release of the clod of earth and roots from the blade when the same is withdrawn from the ground, the main cutting portion 7 of the blade has a longitudinal slot 10. The passage of air through this slot causes the clod to be more easily dislodged.

I claim:

1. A weeding implement comprising a handle, and a blade carried thereby, said blade being curved in cross-section, and having opposite, parallel cutting edges terminating in convexly curved outer ends which converge and meet, the cross-sectional curvature of the blade at the parallel cutting edges being an arc of more than 180 degrees.

2. A weeding implement comprising a handle, and a blade carried thereby, said blade being curved in cross-section, and having opposite, parallel cutting edges terminating in convexly curved outer ends which converge and meet, and said cutting edges being serrated, the cross-sectional curvature of the blade at the parallel cutting edges being an arc of more than 180 degrees.

3. A weeding implement comprising a handle, and a blade carried thereby, said blade being curved in cross-section, and having opposite, parallel cutting edges terminating in convexly curved outer ends which converge and meet, the cross-sectional curvature of the blade at the parallel cutting edges being an arc of more than 180 degrees, and said blade at the parallel cutting edges having a longitudinal slot.

In testimony whereof I affix my signature in the presence of two witnesses.

LOUISE M. BURNS.

Witnesses:
F. B. SAURANCE,
FRANK KOHN.